US008992319B1

(12) United States Patent
Pascal et al.

(10) Patent No.: US 8,992,319 B1
(45) Date of Patent: Mar. 31, 2015

(54) SLOT MACHINE WITH ISOMETRIC SYMBOLS

(75) Inventors: Andrew Pascal, Las Vegas, NV (US); Nicholas Koenig, Corralitos, CA (US)

(73) Assignee: PlayStudios, Inc., Las Vegas, NV (US)

( * ) Notice: Subject to any disclaimer, the term of this patent is extended or adjusted under 35 U.S.C. 154(b) by 0 days.

(21) Appl. No.: 13/348,321

(22) Filed: Jan. 11, 2012

(51) Int. Cl.
*A63F 13/00* (2014.01)

(52) U.S. Cl.
USPC .................. 463/32; 463/16; 463/20; 463/22; 463/25; 463/31; 463/43

(58) Field of Classification Search
USPC .................. 463/16–20, 22, 25, 31–34, 39–43
See application file for complete search history.

(56) References Cited

U.S. PATENT DOCUMENTS

| | | | | |
|---|---|---|---|---|
| 6,908,381 | B2 * | 6/2005 | Ellis | 463/13 |
| 2001/0016513 | A1 * | 8/2001 | Muir et al. | 463/16 |
| 2007/0155507 | A1 * | 7/2007 | Gatto et al. | 463/42 |
| 2010/0041472 | A1 * | 2/2010 | Gagner et al. | 463/26 |
| 2011/0053675 | A1 * | 3/2011 | Aoki et al. | 463/20 |

* cited by examiner

*Primary Examiner* — Sunit Pandya
(74) *Attorney, Agent, or Firm* — Muskin & Farmer LLC

(57) ABSTRACT

A method, apparatus, and computer readable storage to implement slot machine game that uses isometric symbols. The isometric symbols scroll on the screen in three-dimensions which also accommodate for hidden line removal. The game can be displayed on a traditional two-dimensional output device or an autostereoscopic display.

17 Claims, 9 Drawing Sheets

SLOT MACHINE WITH ISOMETRIC SYMBOLS

BACKGROUND OF THE INVENTION

1. Field of the Invention

The present general inventive concept is directed to a method, apparatus, and computer readable storage medium directed to a slot machine game that uses isometric symbols.

2. Description of the Related Art

Slot machine games are a billion dollar industry. Slot machine games receive a wager from a player and use two-dimensional symbols in a flat matrix (typically 5 by 3 although other dimensions are used as well) which spin the symbols until they stop at random locations. The wager is resolved based on the final arrangement of the symbols.

The traditional two-dimensional slot machine display can grow monotonous for players, as players become more responsive to improved graphics. Therefore, what is needed is a slot machine game which uses a display paradigm which provides more excitement and interest for players.

SUMMARY OF THE INVENTION

It is an aspect of the present invention to provide an exciting slot game display methodology.

The above aspects can be obtained by (a) executing instructions on an electronic processing unit to perform the following operations: (b) receiving a prompt from a player to initiate the game; (c) displaying a set of reels of isometric symbols on an electronic output device; (d) spinning each of the reels of isometric symbols a variable amount until the reels come to rest in a final arrangement; (e) determining whether the final arrangement forms a predefined combination; and (f) upon the final arrangement forming the predefined combination providing the player an award.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Further features and advantages of the present invention, as well as the structure and operation of various embodiments of the present invention, will become apparent and more readily appreciated from the following description of the preferred embodiments, taken in conjunction with the accompanying drawings of which.

DESCRIPTION OF THE PREFERRED EMBODIMENTS

Figure 1:
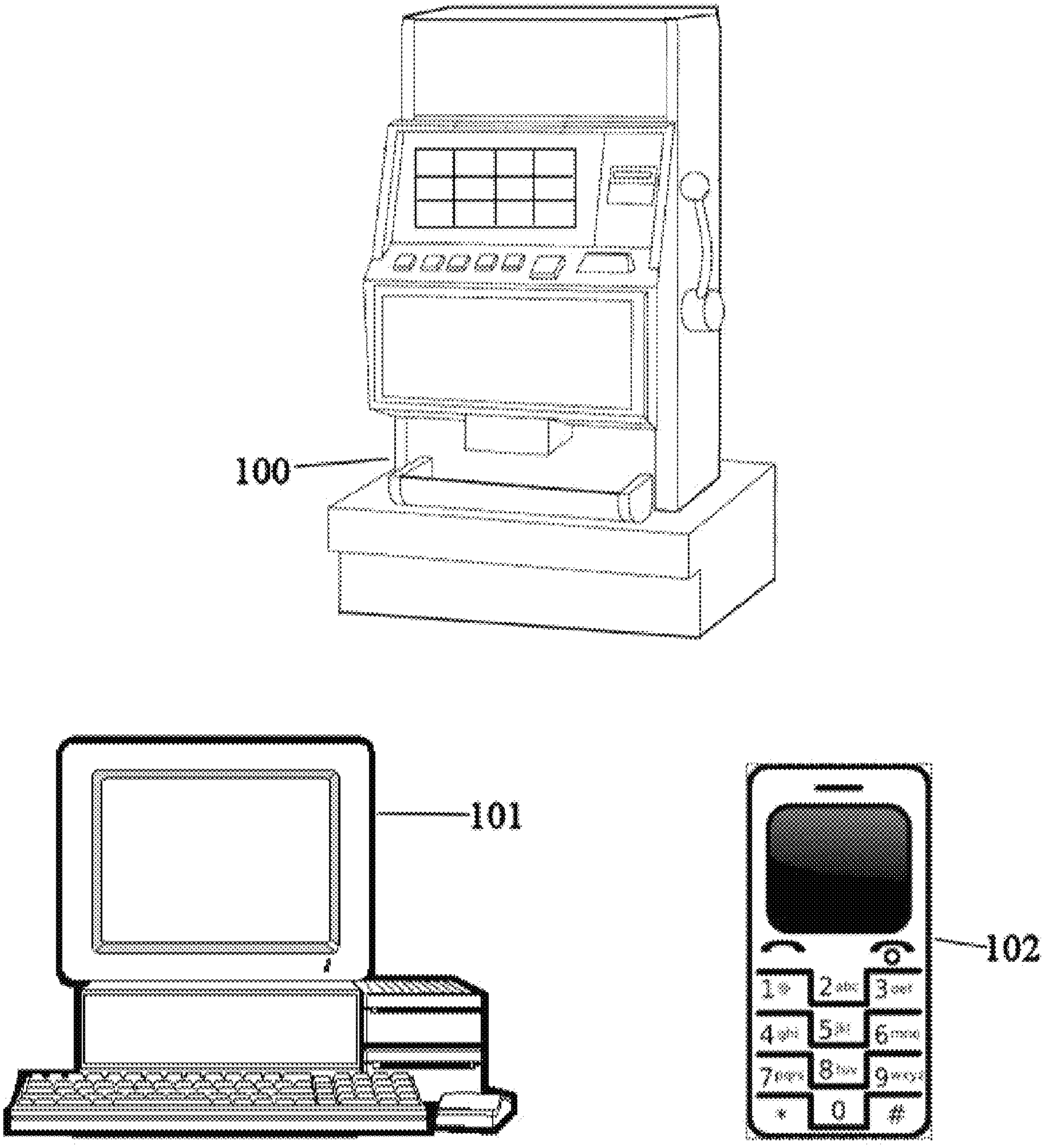
FIG. 1 is a drawing illustrating numerous apparatuses that can play the slot machine game described herein, according to an embodiment.

Reference will now be made in detail to the presently preferred embodiments of the invention, examples of which are illustrated in the accompanying drawings, wherein like reference numerals refer to like elements throughout.

The present inventive concept relates to slot machines, for example see U.S. Pat. No. 8,007,357, which is incorporated by reference in its entirety for all purposes. More particularly, the present inventive concept relates to a method, apparatus, and computer readable storage medium to display a slot type of game using isometric symbols. Isometric symbols are symbols that appear as if they are in three-dimensions even though the output device being used is limited to displaying in two-dimensions (although in another embodiment a true three-dimensional autostereoscopic display can be used as well).

FIG. 1 is a drawing illustrating numerous apparatuses that can play the slot machine game described herein, according to an embodiment.

The slot game described herein can be played on a traditional slot machine 100 that is found in brick and mortar casinos. Cash (or cashless vouchers) can be inserted into the machine 100 using a bill acceptor which credits the machine with a respective amount of credits which can then be used to play the game, and winnings are paid out in the form of credits which can then be cashed out for cash or a cashless voucher that can be redeemed for cash. The game described herein can exist on a software module pre-installed on the slot machine 100 or can be downloaded to the slot machine 100 from a central remote server.

The slot game described herein can also be played on a computer 101 such as a personal computer, laptop, etc. The slot game can be downloaded to the computer 101 and stored locally on the computer 101. Alternatively, the computer 101 can have an internet connection (not illustrated) so that the game can be served from a remote location and player and displayed on the computer 101. For example, the game can be played on an online casino (wherein the player can wager for real money using a credit card or other deposit method, where legal) in which the results are determined on a remote server and transmitted to the computer 101 so that the computer displays the results. The game can also be played on the computer 101 for "casual play" on a social networking site (e.g., FACEBOOK, MYSPACE, etc.) wherein the game software can be launched from within the social network site itself "Casual play" is where the game can be played not for real money but for credits which typically have no cash value, but can have other benefits to the player.

The slot game described herein can also be played on a cell phone 102 or any other type of portable device, such as a tablet computer, etc. The portable device can implement any of the paradigms described above with respect to the computer 101 (e.g., online casino, social networking site, etc.)

Figure 2:
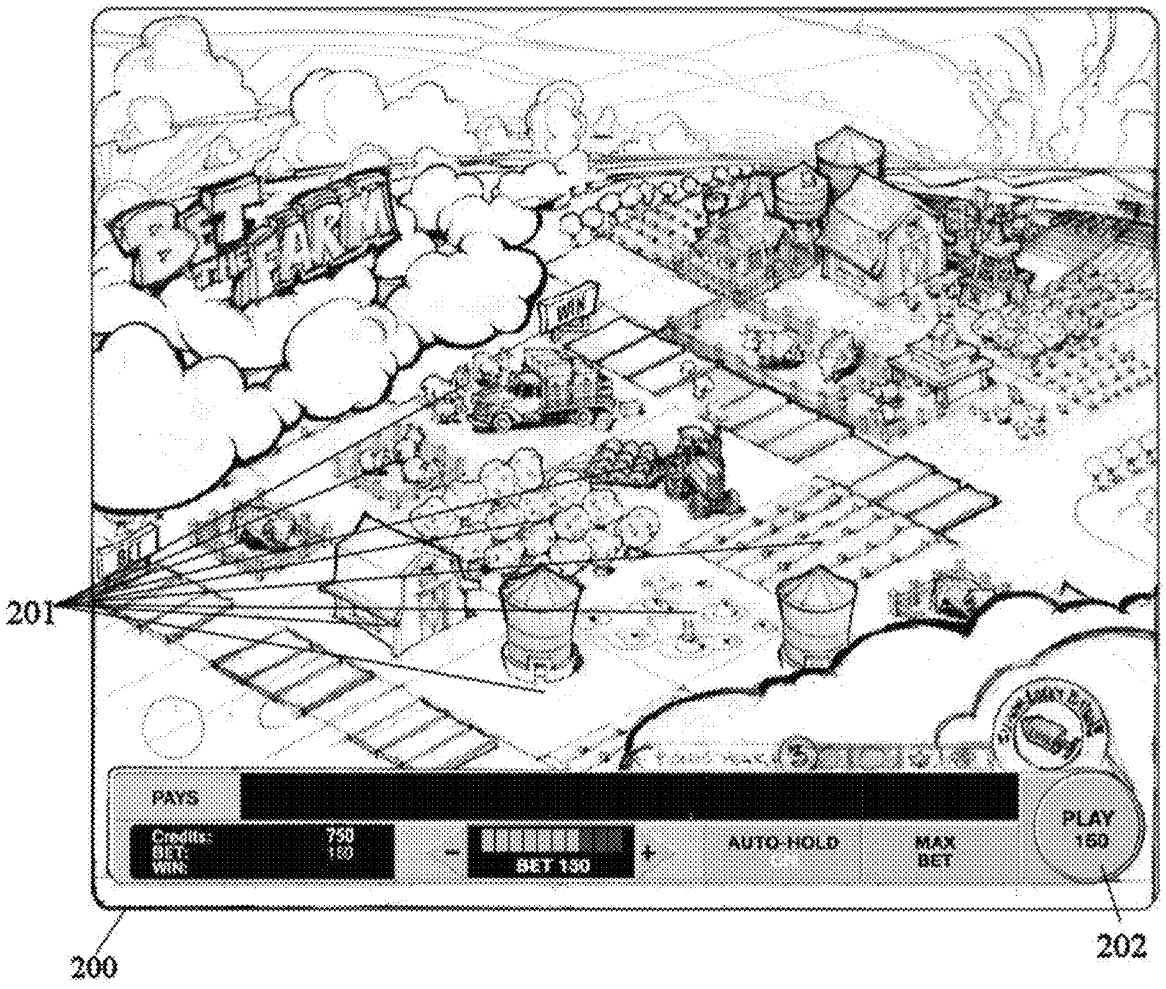
FIG. 2 is a drawing of an initial arrangement if isometric slot machine symbols before a spin, according to an embodiment.

FIG. 2 is a drawing of an initial arrangement if isometric slot machine symbols before a spin, according to an embodiment.

An electronic output device 200 displays the game and the playing field 201. The playing field 201 in this example is a 3 by 3 grid in which winning combinations are determined based on the symbols in the 3 by 3 grid, although in other embodiments different sized grids can be used as well (e.g., 5 by 3 or others). Thus, playing field 201 points to the nine symbols in the 3 by 3 grid which are used in the game, while other symbols may be visible outside of the playing field which are not used to determine winning combinations.

A paytable can be used to determine whether there are winning combinations. For example, Table I illustrates one example paytable. Of course this paytable is for illustrative purposes only and other combinations of symbols and their respective payouts can be used.

TABLE I

| Combination | payout |
|---|---|
| house/house/house | 500:1 |
| barn/barn/barn | 100:1 |
| trees/trees/trees | 50:1 |
| silo/silo/silo | 20:1 |
| tractor/tractor/tractor | 15:1 |
| pigs/pigs/pigs | 10:1 |
| barn/barn/barn | 5:1 |
| crops/crops/crops | 2:1 |
| all others | 0 |

Paylines can be assigned which designate which symbols in the playing field are used to compare to the winning combinations in Table I. For example, three paylines can be used which represent the top row of three symbols, the middle row of three symbols, and the bottom row of three symbols (rows being from the bottom left to the top right). For example, the first payline (the top row) in FIG. 2 comprises; the pig, piglets, and tractor. The second payline (the middle row) in FIG. 2 comprises: barn, trees, tractor. The third payline (the bottom row) in FIG. 2 comprises: silo/gophers/crops. Of course more than three paylines can be used (up to 27 in a 3 by 3 grid) and paylines can comprise any arbitrary designation of positions in the playing field (although typically paylines do not include more than one symbol in the same column because reels along the column).

Typically, a player can select which paylines (out of a maximum number of paylines offered) the payer wishes to play and will make a wager (typically an equal wager) on each of the paylines. Thus, for example with 3 paylines and a 50 credit bet per paylines results in a 150 credit wager per spin.

It is also noted that the arrangement of symbols on all of the reels of the slot game are typically predetermined. For example, Table II below represents one example mapping of three reels of the slot game. Note that these reels have 16 reels stops on each but of course reels can be designed using any number of reel stops. The stops can be numbered from 1 to 16 (or 0 to 15). Thus, (assuming non-weighted reels) a random result can be determined by taking a random number from 1 to 16 for each reel and then stopping that reel on its respective random number. It is noted that the reels are continuous in that after the last ($16^{th}$) symbol then the first symbol appears (like a strip with ends glued together).

TABLE II

| | |
|---|---|
| Reel 1: | T-H-D-P-O-W-B-S-C-G-H-D-P-H-W-O |
| Reel 2: | C-P-O-G-S-W-P-O-T-H-O-G-B-D-C-S |
| Reel 3: | D-T-C-W-H-S-D-T-H-S-D-B-P-O-G-W |

Legend: W = cow; B = barn; S = silo; P = pigs; T = Tractor; O = oak trees; D = donkey truck; C = crops; G = gophers; H = house.

This example game has 10 unique symbols and each symbol would be drawn in three-dimensions using any off the shelf (or proprietary) three-dimensional modeling program, such as MAYA, 3DS MAX, etc. The three-dimensional model can be stored in the computer's storage for later retrieval when it is needed for display (more on the actual display generation will be described below).

In FIG. 2, the player wagers 150 credits (50 credits on each of three paylines) and presses the play button 202. Pressing the play button is considered a player prompt which causes the game to initiate and the reels to spin. On a physical slot machine 100, the player would be making a real cash wager (in the form of credits) and press a physical spin button (or a virtual play button 202 on touch-screen) to start the game. Using the computer 101, on an online casino the player could make a real cash wager and press the play button 202 to initiate the game, the play button 202 typically being pressed by using an input device such as a mouse or keyboard. Using the computer 101, the game can be played for casual play wherein the credits do not represent a cash amount and typically have no cash value, wherein the play button 202 is pressed using an input device such as a mouse or keyboard.

Note that the symbols on the output device are isometric, that is they appear drawn in three-dimensions. Note that "hidden parts" of the game are not displayed. For example, note that the "silo" symbol (the first symbol of the bottom row) blocks a portion of the "tree" symbol in the middle of the playing field.

Figure 3:
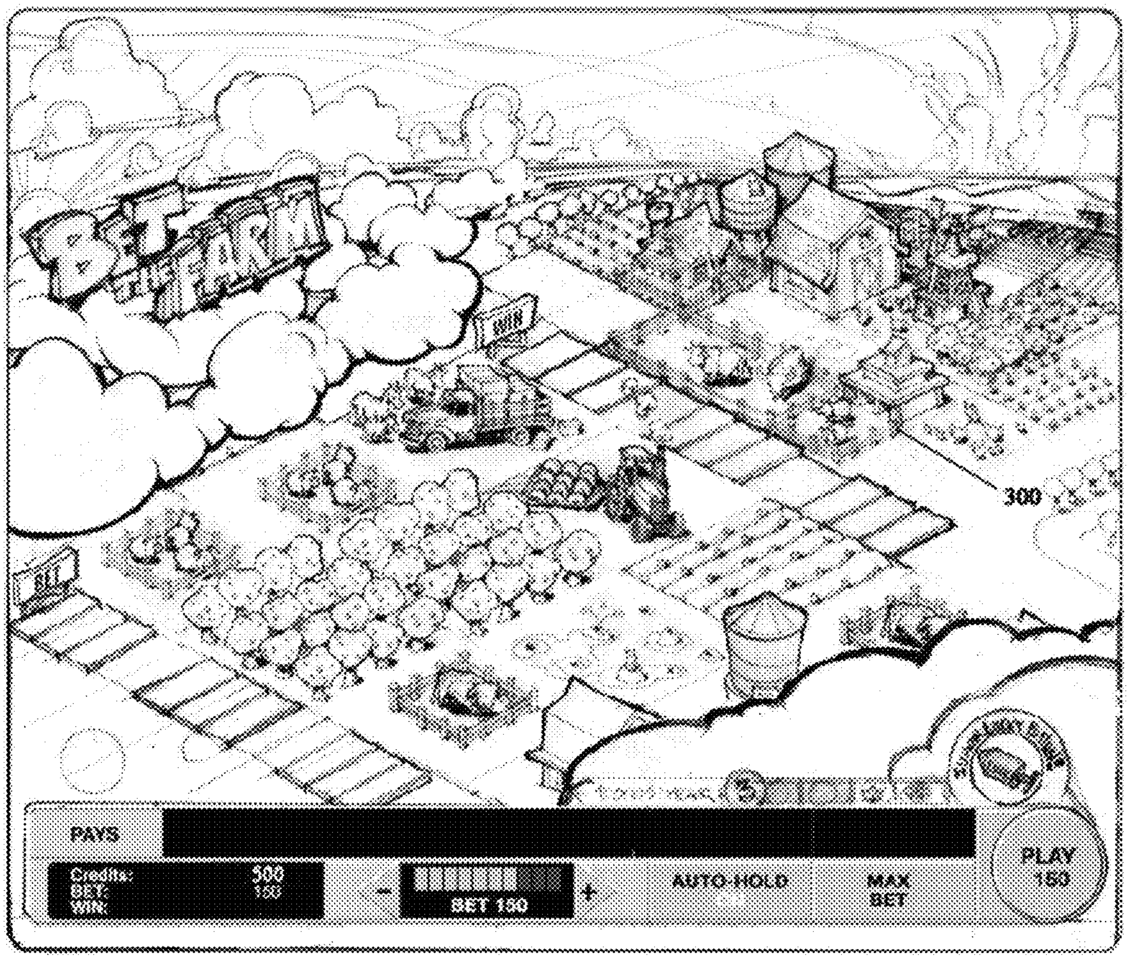
FIG. 3 is a drawing of a first time during the spin, according to an embodiment.

Assuming the player presses the play button 202, then the reels will start spinning and can proceed to displaying FIG. 3. Note that FIGS. 2 through 7 represents possible outputs of the game in time sequence to illustrate the game but note that there would be additional images displayed between these figures.

FIG. 3 is a drawing of a first time during the spin, according to an embodiment.

The player presses the play button 202 (which can also be known as a "spin" button) and the reels start spinning. Note that the credit meter in the bottom right has dropped from 750 to 500, this is because upon initiating (prompting) a spin, the wager amount (150) is deducted from the credit meter.

For visual effect, the first reel starts spinning while the remaining two reels remaining stationary and will start spinning shortly. In another embodiment, all three reels can start spinning immediately. Note that there are also stationary areas 300 that show isometric symbols that are not part of the reels and hence do not move. These stationary areas are provided just for visual effect to enhance the realism of the game.

Figure 4:
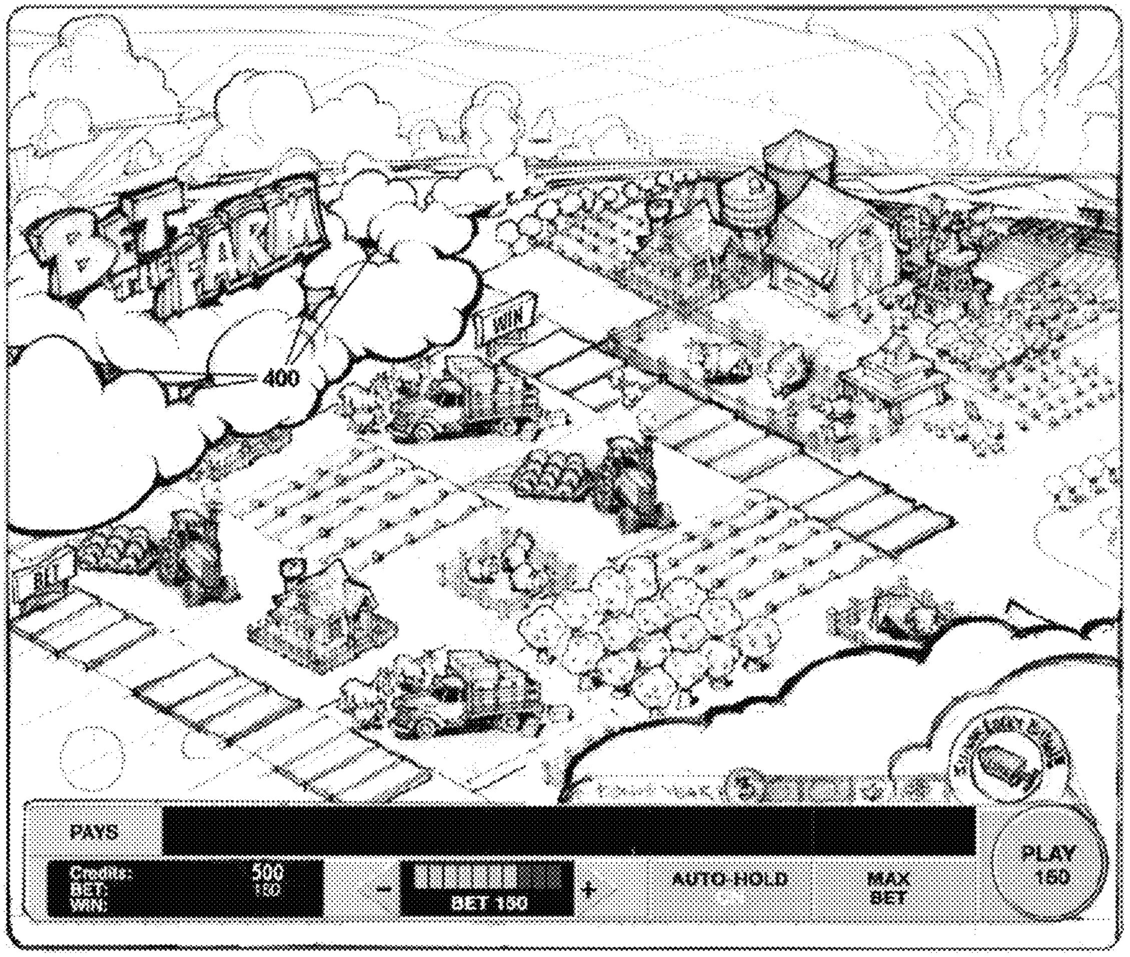
FIG. 4 is a drawing of a second time during the spin, according to an embodiment.

FIG. 4 is a drawing of a second time during the spin, according to an embodiment.

In FIG. 4, all three reels are now spinning, although note that the third reel starts spinning "backwards" briefly (just for a visual effect). Also note that the isometric symbols can appear off the playing field. For example through parts of the clouds there are off playing field reel areas 400 which show the isometric symbols (or parts of them) but the symbols shown in the off playing field reel areas 400 are not relevant to the game because they do not fall on any of the paylines. The off playing field reel areas 400 are just shown for visual effect to provide more realism. Thus, in other words, you can see artifacts of the reels spinning "behind the clouds" although instead of clouds of course other objects can be shown in the game which block parts of the reels.

Figure 5:
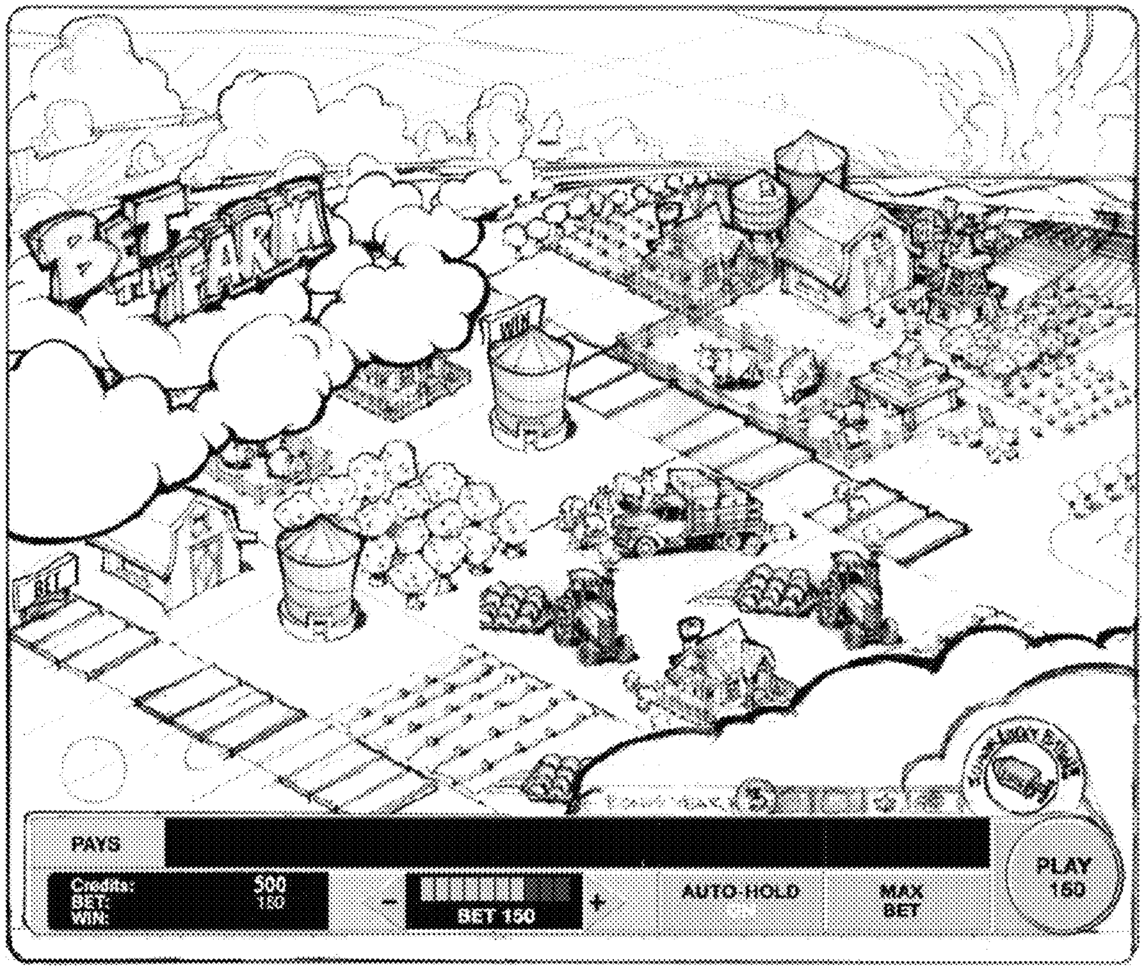
FIG. 5 is a drawing of a third time during the spin, according to an embodiment.

FIG. 5 is a drawing of a third time during the spin, according to an embodiment. In FIG. 5, all three reels continue spinning. Note how during the spin, the isometric symbols can block other isometric symbols so that hidden parts of symbols (and other objects shown) are not shown. For example, note how the silo in the middle position of the leftmost position blocks the trees "behind" it, thus providing a more realistic effect.

Figure 6:
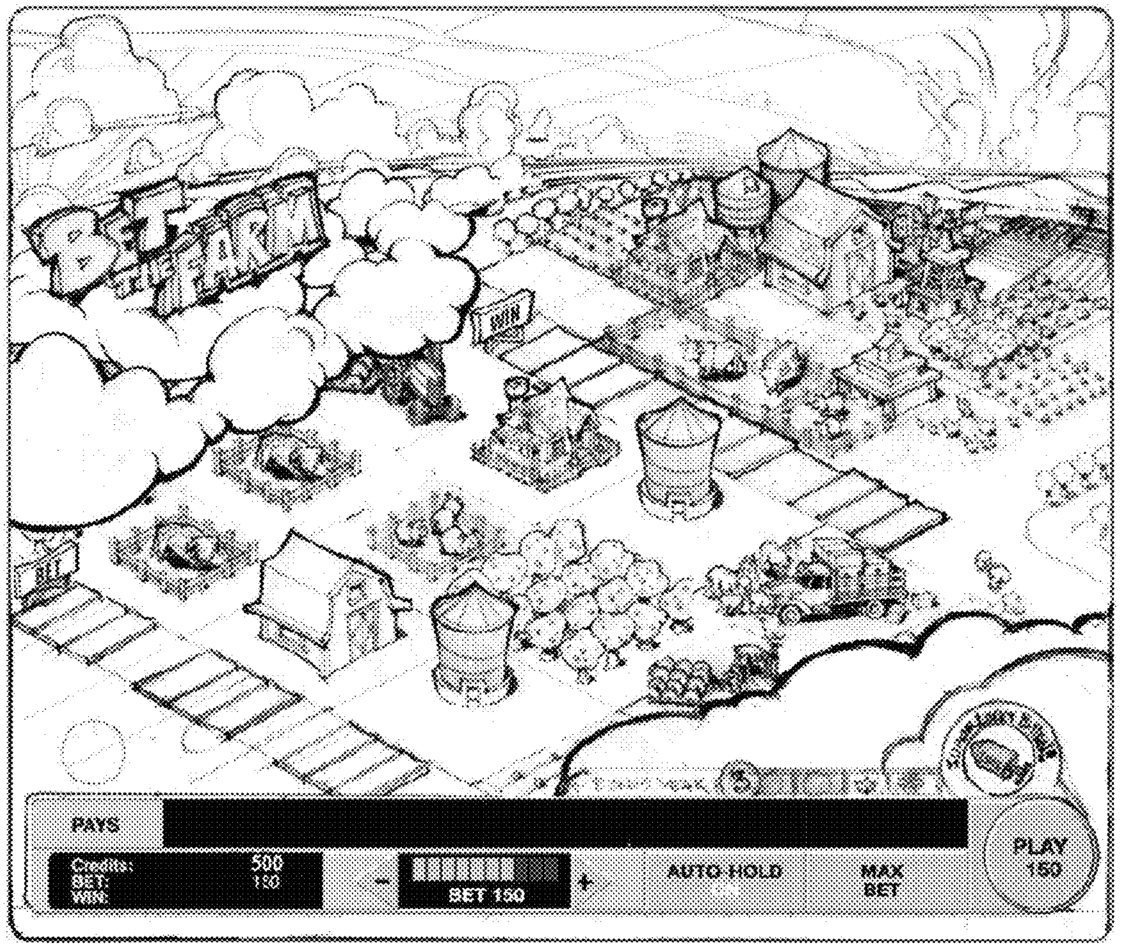
FIG. 6 is a drawing of a fourth time during the spin, according to an embodiment.

FIG. 6 is a drawing of a fourth time during the spin, according to an embodiment. In FIG. 6, all three reels continue spinning.

Figure 7:
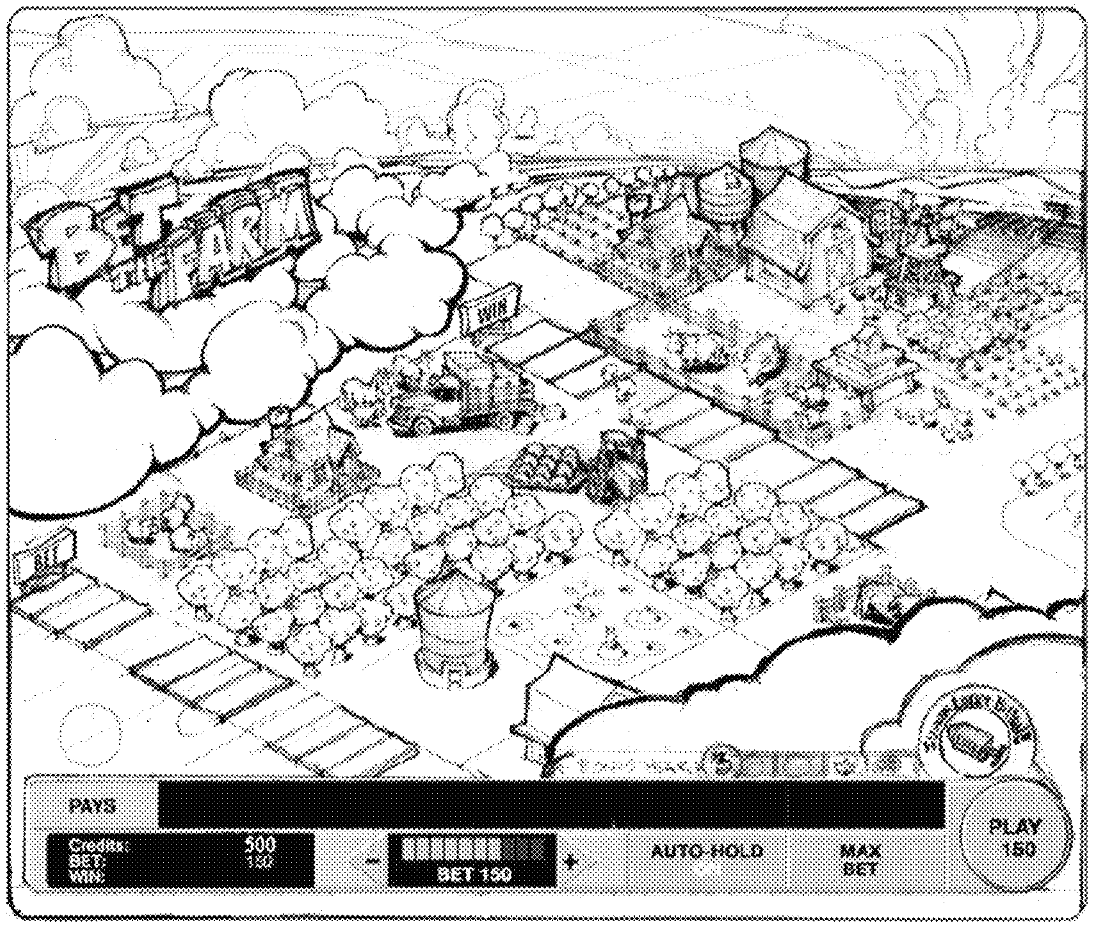
FIG. 7 is a drawing of a completion of the spin, according to an embodiment.

FIG. 7 is a drawing of a completion of the spin, according to an embodiment.

In FIG. 7, the reels have come to a stop and thus form a final arrangement. The time for a typical spin (from the time the player presses the play button 202 until the reels stop spinning) can typically take around 1-2 seconds. Since the resulting combination of symbols in the final arrangement in FIG. 7 does not comprise any of the winning combinations (from Table I) on any of the paylines, this game (spin) is a loser as the player does not win anything. Of course the player can spin again for a new game.

Figure 8:
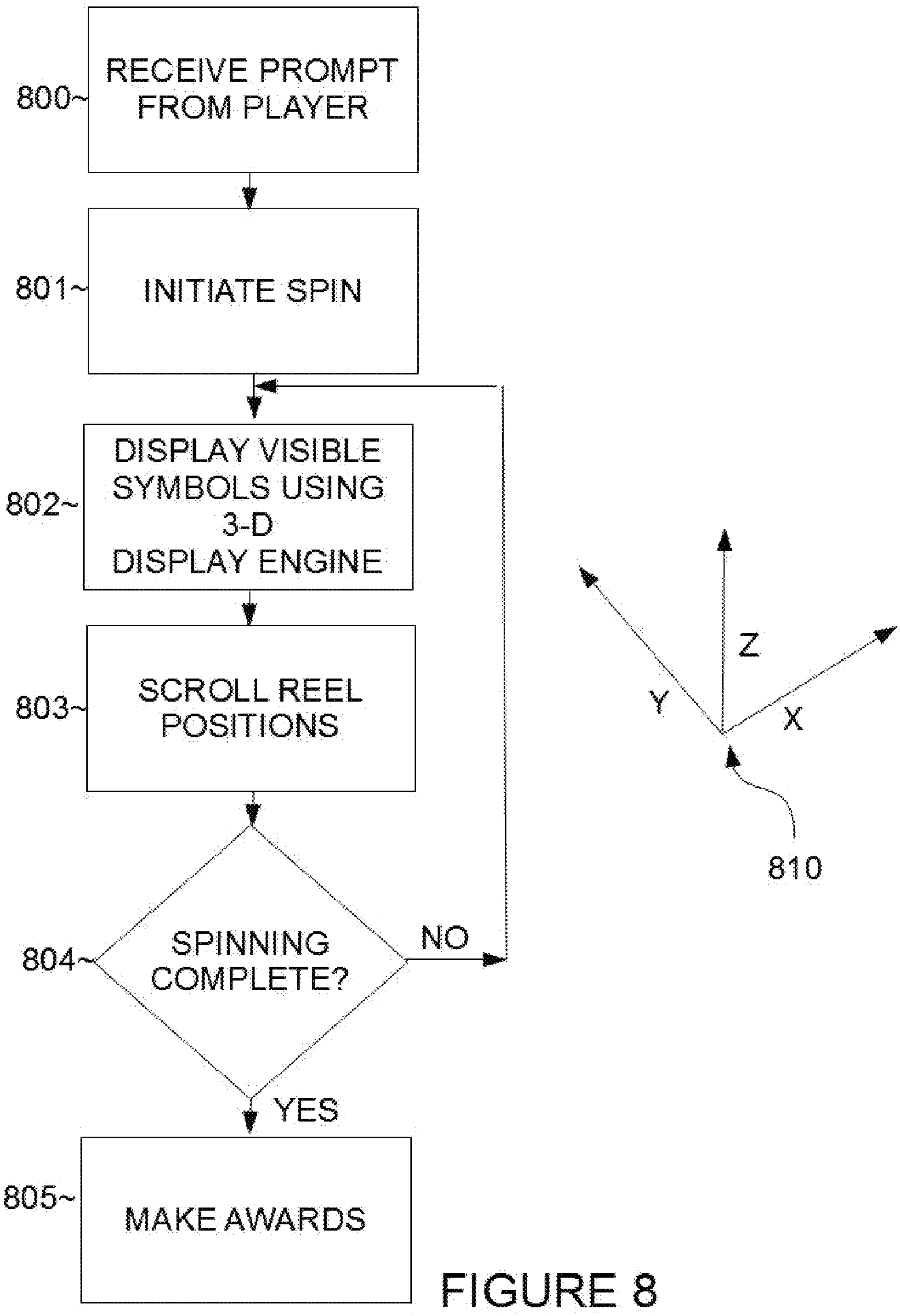
FIG. 8 is a flowchart illustrating an exemplary method of implementing a slot machine game with isometric symbols, according to an embodiment.

FIG. 8 is a flowchart illustrating an exemplary method of implementing a slot machine game with isometric symbols, according to an embodiment.

The method can begin with operation 800, which receives a prompt from the player. The prompt is an input received from the player which indicates that the player wants to play the game and spin the reels. The prompt can come in different forms, for example in the version played on a physical slot machine the player prompt would be the player placing a real money wager (by pressing buttons on the machine) and then pressing a play or spin button. In the version played on a home computer, the prompt is the player placing a real money wager (in the case of an online casino being played for real money) or a deposit/payment of non-cash value credits (in the case of casual play) and the activation of a play or spin button on the computer (by using the computer's keyboard or mouse). The embodiments where the player is playing using an online casino or as a casual game can be played within the player's web browser which is running on their computer.

From operation 800, the method proceeds to operation 801, which initiates a spin. While not required, the result of the spin can be determined immediately upon receiving the prompt (and hence the spinning of the reels is a mere visual effect to provide more enjoyment for the player but the result/outcome is already known to the computer). If the game is being played as a casual game or an online casino, then the result would typically be transmitted to the player's computer from the server that is operated by the casual game or online casino (so that the player cannot hack and set their own results). The result can be determined (in one embodiment) by choosing a random reel stop for each of the reels in the game. Once the results are determined, the computer will scroll the reels around (for example they can each make one complete rotation) and then stop at their respective positions (the randomly chosen reel stop would then appear in the first row (the top) of each visible reel). Once the top visible reel stop is known, then of course it is deterministic what symbols will appear below the top visible stop since the reel arrangements are predetermined.

The wager amount is also deducted from the player credits and the paylines that have been activated are typically highlighted so that the player knows which paylines the player paid for.

A starting position for the reel spin can also be set, although this would typically be the same position the reels have stopped in in the previous game so that there is no "jump" in animation when the reels start to spin.

From operation 802, the method proceeds to operation 803, which displays the visible symbols using a known three-dimensional engine (such as TORQUE, GAMESTUDIO, RENDERWARE, etc.) or a proprietarily developed engine.

In one embodiment, each entire reel strip can be generated and stored as a three-dimensional model. As the reels spin, the section on the reel that is displayed moves along the reel strip (and when it reaches the end it starts at the beginning for a continuous reel). A location variable can be used for each reel to designate which part of the reel strip is currently being displayed (e.g., which part of the reel is currently being displayed at the top of the screen for that reel (or the location variable can be a range of locations on the reel strip that are currently being displayed) The locations that are currently to be displayed for each reel are passed to the graphics engine which displays that section of the reel in its designated area on the screen. Note that instead of storing individual symbols isometrically and then constructing the reel on the display by piecing the individual symbols together, alternatively the entire linear reel strip itself can be stored as a three-dimensional object which is then slided (rotated) through the displayed reel area in order to accomplish the same isometric effect (with the last symbol on the strip then followed by the first symbol on the strip to simulate a "circular" reel strip which can be slided through the displayed reel area numerous times).

The graphics engine would display the identified portion of the reels in three-dimensions alongside all other objects on the screen (the other reels and the stationary three-dimensional objects) and would render them in accordance with its graphical constructs (e.g., remove hidden lines, shade objects using the specified lighting, perspective, etc.)

From operation 802, the method proceeds to operation 803 which scrolls the reel positions to the next position. In one embodiment, each of the location variables can incremented (by 1 or other offset) which will result in the reels moving slightly (when operation 802 executed again). Note that the location referred to herein is not the actual reel stop number but a value that points to a particular pixel location on the entire reel strip. For example, if the dimensions of each reel are 200×200 and there are 16 symbols on a reel, then the reel would comprise 3,200 lines. The location variable would scroll throughout these 3200 lines (and then start at 0 again) so that the reels can scroll in a smooth manner.

Note that one coordinate system 810 that can be used is that the x-axis is in the direction of the rows in a playing field, the y-axis is in the direction of the columns (or reels) in the playing field, and the z-axis represents the height of the isometric symbol being displayed. The reels will spin along the y-axis. The graphics engine when displaying "tall" isometric symbols (in the z-direction) will "block" other isometric symbols "behind" them from the vantage point of the player so that hidden portions of the playing field (and the remainder of the game that is not on the playing field) will not be displayed. The game may also provide the player the option to set the player's vantage point to suit the player's preference. This is similar to allowing the player to rotate the images displayed in any of the three axes.

Alternatively, instead of displaying a portion of the entire reel strip at once, each individual symbol can be scrolled through and placed in its appropriate portion on the output device using the graphics engine.

From operation 803, the method proceeds to operation 804 which determines if the spinning is complete. If the reels have spun at least a minimum amount of distance (e.g., at least one complete revolution or other distance) and then the reels are currently located in their final position (determined in operation 801) then the reels can stop spinning at their final arrangement and the method can proceed to operation 805.

If the reels are not done spinning yet, then the method can return to operation 802 which continues the reels spinning. In an embodiment, some reel(s) may stop spinning (when they are in their proper position) while other reel(s) may continue (until that reel reaches its proper position).

If in operation 804, it is determined that the spinning is complete, then the method proceeds to operation 805, which makes awards to the player. The active paylines on the final reel arrangement are all compared to the paytable being used to see if there are any winning combination(s). If there are any winning combination(s), then the player wins their respective award. All winning combinations are awarded. If the game being played is for real money and the player won an award, then an appropriate amount of cash (or credits redeemable for cash) is awarded to the player. If the game being played is a casual game and the player won an award, then an appropriate amount of non-cash value credits is awarded to the player. Of course, if the final arrangement does not contain any winning combination on any of the paylines, then the player does not win an award and loses whatever wager or deposit the player made in operation 800.

Figure 9:
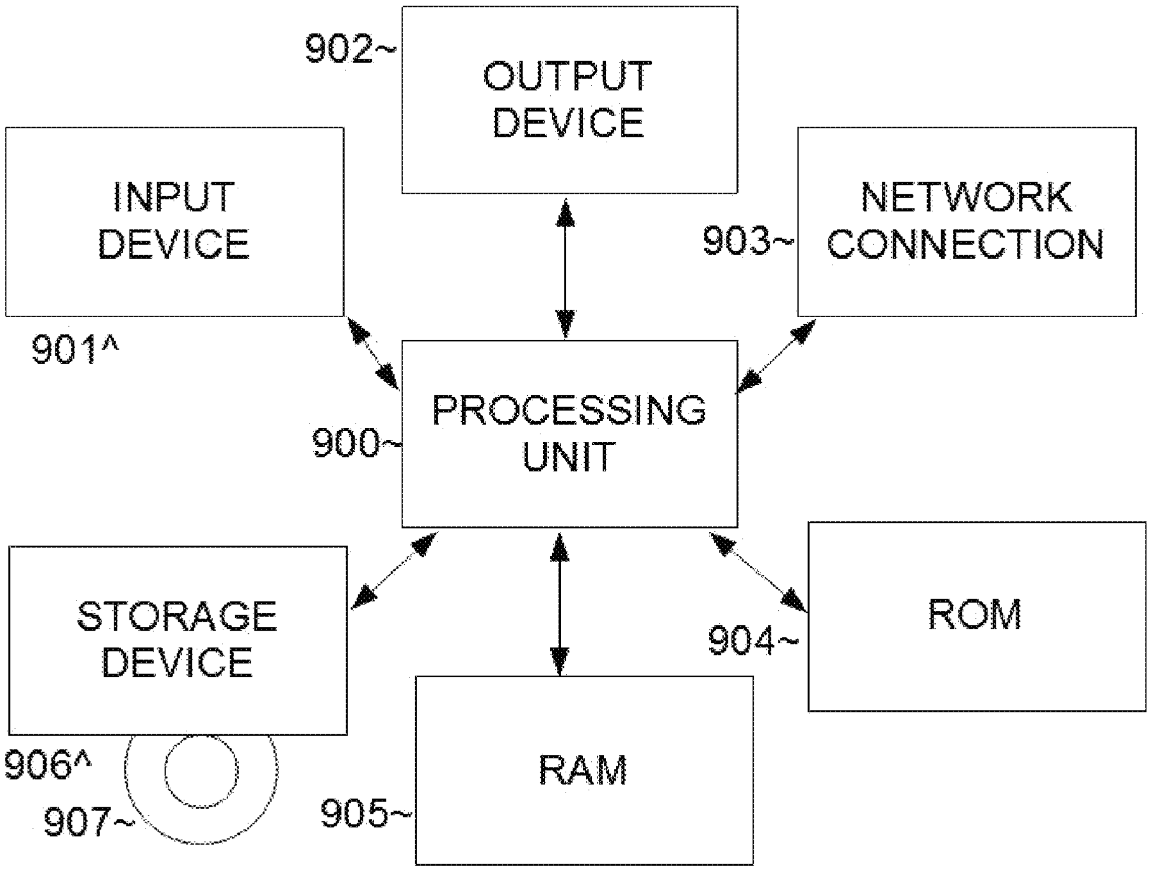
FIG. 9 is a block diagram illustrating exemplary hardware that can be used to implement the game described herein, according to an embodiment.

FIG. 9 is a block diagram illustrating exemplary hardware that can be used to implement the game described herein, according to an embodiment. The hardware in FIG. 9 can be used to implement a computer implementing the game described herein and/or a server that is serving the game to a computer which is displaying the game to a player.

A processing unit 900 can be a microprocessor and associated structure (e.g., bus, cache, clock, etc.) which can be connected to an input device (e.g., touch-screen, keyboard, mouse, buttons, etc.) and an output device (e.g., touch-screen, CRT, monitor, etc.) The processing unit 900 can also be connected to a network connection 903 which can connect to a computer communications network such as the Internet, Wi-Fi, LAN, WAN, etc. The processing unit 900 can also be connected to a ROM 904 and a RAM 905 as used in the art. The processing unit 900 can also be connected to a storage device 906 which can be nonvolatile storage device (e.g., BLU-RAY drive, CD-ROM drive, hard drive, EPROM, etc.) A computer readable medium 907 (e.g., BLU-RAY disc, CD-ROM, hard disc, etc.) can be read by the storage device 906 and can store programs and assets that can cause the processing unit 900 to perform any of the methods described herein. The ROM and RAM can also be loaded with instructions that can cause the processing unit 900 to perform any of the methods described herein.

If a player is playing the game described herein on a social networking site or other type of hosted environment, then the player's computer would cooperate with the social networking server in order to present the game to the player. The player's computer would perform the instructions necessary to display the game while the remote server can determine the results (e.g., the final arrangement) and communicate this result via the Internet to the player's computer so that the player's computer can accurately display the result. The remote server may track and account for all credits wagered and won/lost while the player's computer can display the amount of credits owned or won at the direction of the remote server so the player cannot tamper with these amounts.

Any description of a component or embodiment herein also includes hardware, software, and configurations which already exist in the prior art and may be necessary to the operation of such component(s) or embodiment(s).

Further, the operations described herein can be performed in any sensible order. Any operations not required for proper operation can be optional. Further, all methods described herein can also be stored on a computer readable storage to control a computer.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method to implement a slot game, the method comprising:

executing instructions on an electronic processing unit to perform the following operations:

receiving a prompt from a player on a touch screen connected to the processing unit to initiate the game;

displaying a set of reels of three dimensional symbols on the touch screen, wherein each displayed reel in the set of reels comprises a plurality of displayed symbols in a Y direction, each displayed reel in the set of reels is displaced from each other displayed reel in the set of reels in an X direction, the X direction perpendicular to the Y direction and being in a same plane, each displayed symbol in the plurality of symbols displays its structure with a height in a direction Z, Z rising and being perpendicular to the X-Y plane;

spinning each of the reels by sliding each displayed reel along the Y-direction a variable amount until the reels come to rest in a final random arrangement determined by a random number generator, wherein hidden portions of the three dimensional symbols displayed on each of the reels are not displayed;

determining whether the final arrangement forms a predefined combination; and upon the final arrangement forming the predefined combination providing the player an award.

2. The method as recited in claim 1, wherein a playing grid defines a set of the symbols that are evaluated for the predefined playing combination, and the spinning displays some symbols on the reels that are outside of the playing grid.

3. The method as recited in claim 1, wherein the prompt from the player comprises a monetary wager and the award comprises a monetary award.

4. The method as recited in claim 1, wherein the prompt from the player comprises a deposit of credits from the player.

5. The method as recited in claim 4, wherein the credits are non-cash value credits.

6. The method as recited in claim 5, wherein the award is non-cash value credits.

7. The method as recited in claim 1, wherein the game is played on a home computer which receives the final arrangement from the Internet.

8. The method a recited in claim 7, wherein the game is embedded in a social networking site.

9. The method as recited in claim 1, further comprising, displaying a three dimensional stationary area that is not part of the reels and does not move.

10. An apparatus, the apparatus comprising:

an electronic touch screen input and output device;

a processing unit operationally connected to the touch screen input and output device and configured to perform:

receiving a prompt from a player on the touch screen to initiate a game;

displaying a set of reels of three dimensional symbols on the electronic output device, wherein each displayed reel in the set of reels comprises a plurality of displayed symbols in a Y direction, each displayed reel in the set of reels is displaced from each other displayed reel in the set of reels in an X direction, the X direction perpendicular to the Y direction and being in a same plane, each displayed symbol in the plurality of symbols displays its structure with a height in a direction Z, Z rising and being perpendicular to the X-Y plane;

spinning each of the reels by sliding each displayed reel along the Y-direction a variable amount until the reels come to rest in a final random arrangement determined by a random number generator, wherein hidden portions of the three dimensional symbols displayed on each of the reels are not displayed;

determining whether the final arrangement forms a predefined combination; and upon the final arrangement forming the predefined combination providing the player an award.

11. The apparatus as recited in claim 10, wherein the processing unit is further configured such that a playing grid defines a set of the symbols that are evaluated for the predefined playing combination, and the spinning displays some symbols on the reels that are outside of the playing grid.

12. The apparatus as recited in claim 10, wherein the processing unit is further configured such that the prompt from the player comprises a monetary wager and the award comprises a monetary award.

13. The apparatus as recited in claim 10, wherein the processing unit is further configured such that the prompt from the player comprises a deposit of credits from the player.

14. The apparatus as recited in claim 13, wherein the processing unit is further configured such that the credits are non-cash value credits.

15. The apparatus as recited in claim 14, wherein the processing unit is further configured such that the award is non-cash value credits.

16. The apparatus as recited in claim 10, wherein the processing unit is further configured such that the game is played on a home computer which receives the final arrangement from the Internet.

17. The apparatus a recited in claim 16, wherein the processing unit is further configured such that the game is embedded in a social networking site.

* * * * *